(12) United States Patent
Huether et al.

(10) Patent No.: US 8,013,038 B2
(45) Date of Patent: Sep. 6, 2011

(54) METHOD FOR THE HIGH-PRESSURE DISPERSION OF REACTIVE MONOMERS

(75) Inventors: Andreas Huether, Alzenau (DE); Sebastian Roos, Kelkheim (DE); Oliver Ruscitti, Cologne (DE); Heike Schuchmann, Stutensee (DE); Karsten Koehler, Karlsruhe (DE); Caroline Sauter, Karlsruhe (DE); Freddy Aguilar, Darmstadt (DE)

(73) Assignee: Evonik Degussa GmbH, Essen (DE)

( * ) Notice: Subject to any disclaimer, the term of this patent is extended or adjusted under 35 U.S.C. 154(b) by 166 days.

(21) Appl. No.: 12/528,134

(22) PCT Filed: Mar. 20, 2008

(86) PCT No.: PCT/EP2008/053421
§ 371 (c)(1),
(2), (4) Date: Aug. 21, 2009

(87) PCT Pub. No.: WO2008/116839
PCT Pub. Date: Oct. 2, 2008

(65) Prior Publication Data
US 2010/0324211 A1    Dec. 23, 2010

(30) Foreign Application Priority Data
Mar. 26, 2007 (DE) .......................... 10 2007 014 916

(51) Int. Cl.
*C09B 67/00* (2006.01)
(52) U.S. Cl. ........................................................ 523/333
(58) Field of Classification Search .................. 523/333
See application file for complete search history.

(56) References Cited

U.S. PATENT DOCUMENTS

| | | |
|---|---|---|
| 6,207,081 B1 | 3/2001 | Sasaki et al. |
| 2004/0249105 A1 | 12/2004 | Nolte et al. |

FOREIGN PATENT DOCUMENTS

| | | |
|---|---|---|
| EP | 1 018 749 | 7/2000 |
| WO | 2004 076515 | 9/2004 |

*Primary Examiner* — Edward Cain
(74) *Attorney, Agent, or Firm* — Oblon, Spivak, McClelland, Maier & Neustadt, L.L.P.

(57) ABSTRACT

The object of the invention is a method for the dispersion of reactive monomers, wherein a monomer emulsion (8) is fed at a first pressure through a dispersion jet (7) and a second dispersion (9) is fed laterally behind the dispersion jet at a second pressure that is less than the first pressure, both the emulsion and the dispersion being dispersed with one another in a mixing chamber. Using the method, nanoparticle-laden monomer emulsions may be produced that, after polymerization, produce polymer-coated nanoparticles.

17 Claims, 2 Drawing Sheets

METHOD FOR THE HIGH-PRESSURE DISPERSION OF REACTIVE MONOMERS

Figure 1:
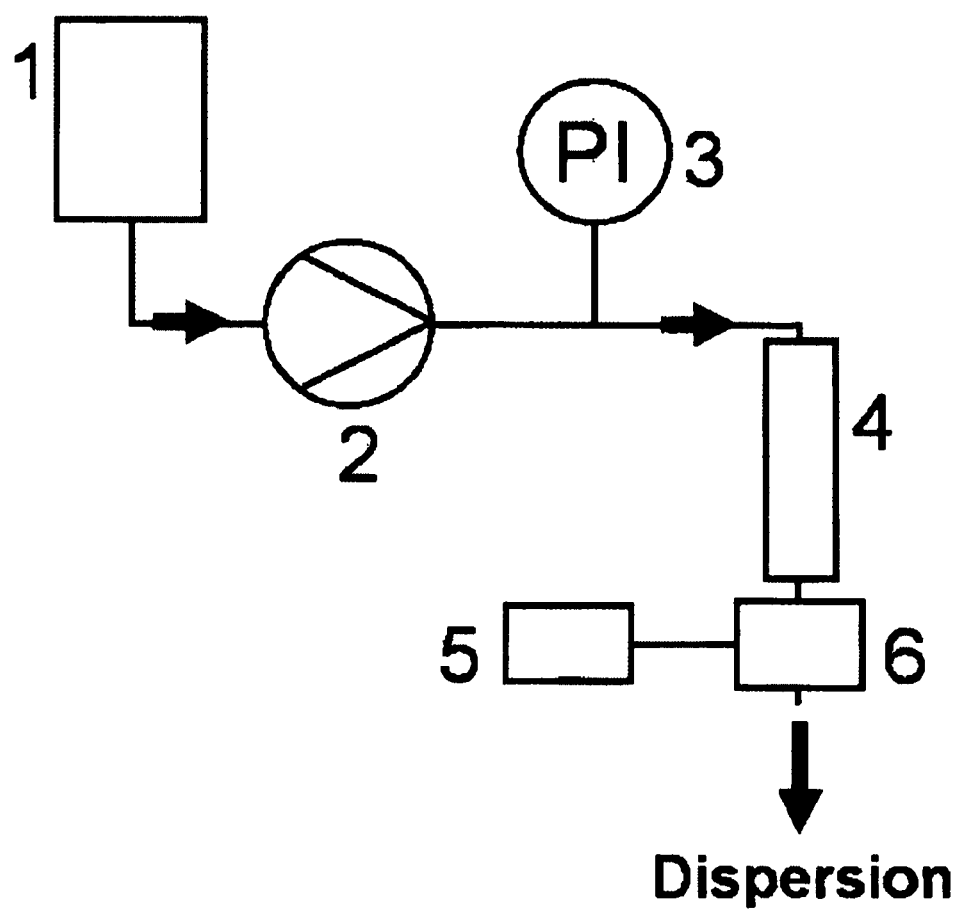

This application is a 371 of PCT/EP2008/053421, filed Mar. 20, 2008.

The invention relates to a method for the dispersion of reactive monomers.

The grinding of various materials in most cases requires special devices. For example, the production of ceramic nanoparticles in stirred ball mills is characterized by high wear on grinding bodies and associated product contamination, high energy inputs and long comminution times. New mill models, which are called high-performance mills, are said to make the comminution of particles down to the lower nanorange more efficient. This is achieved by higher power densities in the grinding chamber and the possibility of using very small grinding bodies (S. Breitung, Produktgestaltung in der Partikeltechnologie [Product design in particle technology], Volume 3, Frauenhofer IRB Verlag). Besides the inefficient cost-effectiveness of these grinding processes and the product contamination, problems with the stabilization of the particles also arise. This can be solved, for example, by adding nitric acid or formic acid.

A large number of intermediates and end products which are supplied by various industrial sectors are particulate materials which include disperse particles in the order of magnitude of a few nanometers. The use of nanoparticles offers decisive advantages e.g. for surface coatings in the use of high-value polishes or in the color intensity of paints and coatings. The particular properties of these particles, however, often only come into play if they are present in a solution in a sufficiently fine form and in homogeneous distribution.

In industry, rotor-stator systems or stirred ball mills are often used to produce dispersions (emulsions or particle suspensions). The power distribution and thus the stress on the drops or particles is in most cases very inhomogeneous here. The dispersion and deagglomeration process is influenced predominantly by the introduced specific energy (Karbstein, Dissertation Karlsruhe, 1994, Kwade, Dissertation Braunschweig, 1997), where the utilization of energy is evaluated as very inefficient. High-pressure dispersion methods permit the input of very high local power densities into the dispersion and thus a more efficient comminution of the agglomerate structures. However, inorganic particle systems are very abrasive, which leads to very high wear of the sapphire or diamond dies used. This problem leads to very high costs and considerably shortens the service time of such plants. The high-pressure dispersion method is very interesting for industry on account of the higher energy efficiency (factor 100-300 compared to rotor-stator systems), but is currently not economical due to the short service times of the dies, especially for particle systems.

EP 782 881 describes a method for the preparation of dispersions of a solid in an O/W or W/O emulsion using a high-pressure disperser, in which all of the components are passed through the die of the high-pressure disperser.

WO 01/05517 describes a method for the preparation of aqueous dispersions of two-component polyurethane coatings by dispersing the monomers using a high-pressure disperser, where additionally abrasive fillers may be present in the dispersion. In the method, all of the components of the dispersion are passed through the dies of the high-pressure disperser. The device has to be manufactured from particularly hard ceramic materials, such as zirconium oxide or silicon carbide.

It was an object to devise a method for the preparation of dispersions and in so doing design the method so that wear is reduced and the high-pressure dispersion becomes economical.

The object was achieved by a method for high-pressure dispersion, characterized in that a first dispersion, which is a monomer emulsion, is fed through a dispersion die at a first pressure and a second dispersion is fed laterally behind the dispersion die at a second pressure, which is lower than the first pressure, and the two dispersions are dispersed in a mixing chamber.

The second dispersion is preferably a suspension, i.e. it comprises a solid in the form of disperse particles. In particular, monomer and polymer dispersions can be dispersed with abrasive materials.

FIG. 1 shows, by way of example, a process set-up. Using a pump 2, preferably a high-pressure pump, the first dispersion, i.e. the monomer emulsion is fed from a storage container 1 via a pulsation dampener 4 to the dispersion die 6. The solid-containing second dispersion is fed from a separate storage container 5 to the dispersion die 6.

Figure 2:
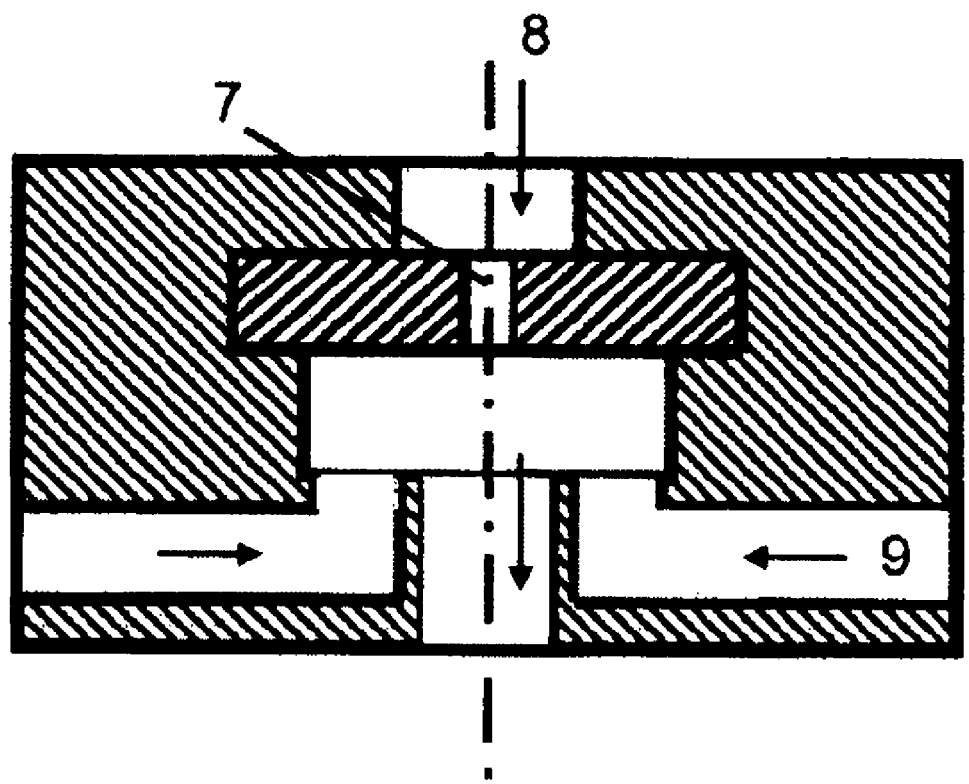

FIG. 2 shows by way of example one embodiment of a suitable dispersion die in which a first dispersion 8 is passed through a perforated die 7 and a second dispersion 9 is fed laterally behind the dispersion die through two or more channels.

In the method according to the invention, the solid particles no longer pass the orifice in the die, but are fed in shortly after it. The wear on the die can therefore be considerably reduced.

Surprisingly, it has been found that in one dispersion step dispersions with both a liquid and also a solid phase can be dispersed simultaneously. In particular, solid/liquid/liquid dispersions can be produced in one dispersion step.

The dispersion die is supplied with a high pressure. The first dispersion is fed at a first pressure and the second dispersion is fed laterally behind the dispersion die at a second pressure which is less than the first pressure. The first dispersion is added via the dispersion die preferably at a pressure of from 10 to 4000 bar, particularly preferably from 100 to 2000 bar. It was found that during the high-pressure dispersion, a strong subatmospheric pressure arises directly after the die. This phenomenon can be utilized for the flowing in of the second dispersion. This is interesting for the supply of particles, in particular abrasive particles.

The axially emerging first dispersion (monomer emulsion) pulls the second dispersion with it and mixes with it. Behind the die exit, the turbulent kinetic energy increases considerably. The forces of inertia in the turbulent flows lead to a dispersion and deagglomeration of particle agglomerates in the liquid with the simultaneous breakage of emulsion drops. Moreover, the cavitation which arises with almost all dispersion dies brings about a further comminution of drops and agglomerates. The considerable narrowing in cross section leads to an increase in the flow rate, meaning that the pressure in and behind the die drops so considerably that cavitation bubbles can form which contribute to the comminution. The wear on the die is considerably reduced by this procedure since only liquid phases flow through the die.

Nevertheless, using this method and the device used comparably good and energy-efficient comminution results are achieved compared with the known high-pressure methods since the dispersion-active area of high local kinetic energy release through turbulence and cavitation is behind the die, where drops and particles are present.

In dispersion experiments, simple perforated dies with a diameter of from 0.05 to 1 mm and a thickness of from 1 to 3 mm were used.

The second dispersion (suspension) is mixed with the first dispersion (monomer emulsion) conveyed through the die and in so doing is diluted with the first dispersion. Particle agglomerates present in the second dispersion are thereby comminuted. At a first pressure on the dispersion die of from 10 to 1000 bar, the dilution can usually be varied between 3:1 and 1:3, in particular from 1:1 to 1:3. In order to increase the particle concentration in the end product, the second dispersion can also be fed simultaneously from a plurality of sides.

The particle concentration in the second dispersion can be increased until the limit of the flowability of the suspension is reached.

The feeding of the second dispersion behind the dispersion die can take place in a very wide variety of ways. The feed angle relative to the die exit of the first dispersion can be chosen freely. Similarly, the cross section of the feed can be chosen freely. Both the shape and also the size of the feed are variable. This is the case provided it is still ensured that the entry of the particle-containing suspension is in the region of the subatmospheric pressure directly behind the die.

The second pressure under which the second dispersion is fed must be considerably below the first pressure of the first dispersion. Preferably, the first dispersion is added via the dispersion die at a first pressure of from 10 to 4000 bar, particularly preferably at 100 to 2000 bar. The second dispersion can be fed in, for example, without pressure by sucking in the medium via the subatmospheric pressure which arises behind the dispersion die. Preferably, the second dispersion is fed in at a superatmospheric pressure of from 0.05 to 100 bar, particularly preferably at a superatmospheric pressure of from 0.5 to 10 bar.

A further advantage of this device is the possibility of simultaneously processing different components of the dispersion. Thus, different media can be fed in after the die. These meet in the mixing chamber, are comminuted and mixed simultaneously. This option can lead to the additional saving of working steps and consequently to a reduction in costs. For example, the second dispersion can be fed in in the form of a dispersion in water and optionally with auxiliaries. Likewise, the second dispersion can be fed in in dispersed form in solvents and optionally with auxiliaries.

The dispersion method according to the invention is characterized in that a monomer emulsion which comprises reactive monomers is fed in as the first dispersion. Suitable monomers are meth(acrylates), styrenes, vinyl acetate, alcohols, acids, amines and isocyanates. The form (meth)acrylate means here both methacrylate, such as e.g. methyl methacrylate, ethyl methacrylate etc., and also acrylate, such as e.g. methyl acrylate, ethyl acrylate etc., as well as mixtures of the two. Preference is given to feeding in a monomer emulsion which comprises a meth(acrylate), particularly preferably methyl methacrylate. The method has the advantage that there are no abrasive particles in the emulsion which would place demands on the dispersion die during use which shortens the service time.

Besides the first dispersion (monomer emulsion), the second dispersion can also optionally comprise reactive components, for example reactive monomers or reactive initiators.

Further constituents, such as the emulsifier, hydrophobic water-insoluble reagents (e.g. hexadecane), transfer agents (e.g. thiols), costabilizers and initiators (e.g. peroxides, azo initiators) and further additives can be added in the emulsion. Hydrophobic reagents are typically understood as meaning sparingly water-soluble agents, as are used in the production of miniemulsions (see. Macromol. Rapid Commun 22, 896 (2001)). Initiators are typically understood as meaning initiators which are suitable for chain or step polymerization. This may also refer to initiator systems which consist of one or more agents (e.g. $FeSO_4$/sodium disulfite/sodium peroxosulfate). When adding initiators, it must be ensured that the energy introduced by the high-pressure dispersion does not heat the dispersed initiators so much that thermal decomposition of the initiator starts. The initiator used can be added either in the first dispersion or else in the second dispersion. The advantage of directly adding the initiator is that further working steps after the dispersion are dispensed with.

The method according to the invention is suitable for the dispersion of abrasive materials, in particular of silicon dioxides, metals, metal oxides, inorganic and organic pigments, carbon blacks, inorganic and organic pigment dispersions and mixtures thereof. Particular preference is given to $TiO_2$, $ZnO$, $ZnS$, $CeO_2$, $ZrO_2$, $Al_2O_3$, $Fe_2O_3$, $Fe_3O_4$, $FeO$, $FeOOH$ and Mg, Cu, Mn and Zn ferrites and mixtures thereof. Together with the abrasive materials, monomers are also dispersed, meaning that structured dispersions are obtained.

The specified inorganic particles can have different surface structures or modifications of the surface. The particles can in particular have surfaces covered with organic molecules (e.g. adsorbed fatty acids or bonded octylsilyl groups or methacrylate groups). The method according to the invention can likewise preferably be used to simultaneously disperse and coat with monomers cadmium-, bismuth-, chromium- and iron-containing pigments, azo and quinophthalone pigments, and also polycyclic aluminum-laked pigments and mixtures thereof.

Preferably, the second dispersion comprises the solid in the form of nanoparticles. The term nanoparticles here means particles whose median of the primary particle size distribution is less than 50 nm. The nanoparticles may be present in the second dispersion also in agglomerated or aggregated form.

The dispersions produced by the method according to the invention can be used immediately or be further used as precursors, for example for polymerizations. The dispersions obtained can likewise be miniemulsions which can in turn be further used in situ for the polymerization. The materials obtained after the polymerization consist of polymer particles with inorganic fractions. The morphology of the various substances can be structured such that the inorganic particles are encased by a spherical polymer phase. In this connection, this encasing is not to be confused with the introduction of inorganic materials into a polymer matrix. Materials produced in this way are referred to as hybrid materials since they combine two completely different materials with one another.

The invention claimed is:

1. A method for dispersion of reactive monomers, comprising
    passing a monomer emulsion with a first pressure through a dispersion die, feeding a second dispersion laterally behind the dispersion die at a second pressure that is less than the first pressure, and dispersing the two dispersions with one another in a mixing chamber,
    wherein the second dispersion fed laterally behind the dispersion die is drawn into the mixing chamber by a subatmospheric pressure behind the dispersion die.

2. The method according to claim 1, wherein the second dispersion is a suspension.

3. The method according to claim 1, comprising passing the monomer emulsion to the dispersion die with a pressure of from 10 to 4000 bar.

4. The method according to claim 2, wherein the second dispersion comprises water as liquid phase.

5. The method according to claim 2, wherein the second dispersion comprises one or more solvents as liquid phase.

6. A method for dispersion of reactive monomers, comprising passing a monomer emulsion with a first pressure through a dispersion die, feeding a second dispersion laterally behind the dispersion die at a second pressure that is less than the first pressure, and dispersing the two dispersions with one another in a mixing chamber, wherein the second dispersion comprises reactive monomers.

7. The method according to claim 6, comprising drawing the second dispersion fed laterally behind the dispersion die into the mixing chamber by a subatmospheric pressure behind the dispersion die.

8. The method according to claim 6, comprising feeding the second dispersion fed laterally behind the dispersion die to the mixing chamber under increased pressure.

9. The method according to claim 8, comprising feeding the second dispersion fed laterally behind the dispersion die to the mixing chamber under a superatmospheric pressure up to 100 bar.

10. The method according to claim 9, feeding the second dispersion fed laterally behind the dispersion die to the mixing chamber under a superatmospheric pressure up to 10 bar.

11. A method for dispersion of reactive monomers, comprising passing a monomer emulsion with a first pressure through a dispersion die, feeding a second dispersion laterally behind the dispersion die at a second pressure that is less than the first pressure, and dispersing the two dispersions with one another in a mixing chamber, wherein the second dispersion is a suspension and comprises nanoparticles.

12. The method according to claim 11, wherein the second dispersion comprises nanoparticles of a silicon dioxide, metal oxide, metal, pigment or carbon black or a mixture thereof.

13. The method according to claim 12, wherein the second dispersion comprises nanoparticles of a silicon dioxide, metal oxide, or a mixture thereof.

14. The method according to claim 12, wherein the second dispersion comprises nanoparticles of a surface-modified silicon dioxide, metal oxide, or a mixture thereof.

15. The method according to claim 12, wherein the second dispersion comprises nanoparticles of one or more metal oxides selected from the group consisting of $TiO_2$, $ZnO$, $ZnS$, $CeO_2$, $ZrO_2$, $Al_2O_3$, $Fe_2O_3$, $Fe_3O_4$, $FeO$, $FeOOH$, Mg ferrite, Cu ferrite, Mn ferrite and Zn ferrite.

16. A method for dispersion of reactive monomers, comprising passing a monomer emulsion with a first pressure through a dispersion die, feeding a second dispersion laterally behind the dispersion die at a second pressure that is less than the first pressure, and dispersing the two dispersions with one another in a mixing chamber, wherein the monomer emulsion or the second dispersion comprises an initiator for the chain polymerization or step polymerization.

17. A method for dispersion of reactive monomers, comprising passing a monomer emulsion with a first pressure through a dispersion die, feeding a second dispersion laterally behind the dispersion die at a second pressure that is less than the first pressure, and dispersing the two dispersions with one another in a mixing chamber, wherein the monomer emulsion comprises a methacrylate or an acrylate.

* * * * *